United States Patent
Egner-Walter et al.

(10) Patent No.: US 6,923,591 B2
(45) Date of Patent: Aug. 2, 2005

(54) WIPER ARRANGEMENT FOR THE WINDSCREEN OF A MOTOR VEHICLE

(75) Inventors: Bruno Egner-Walter, Heilbronn (DE); Eckhardt Schmid, Brackenheim (DE)

(73) Assignee: Valeo Wischersysteme GmbH (DE)

( * ) Notice: Subject to any disclaimer, the term of this patent is extended or adjusted under 35 U.S.C. 154(b) by 94 days.

(21) Appl. No.: 10/333,450
(22) PCT Filed: Jul. 19, 2001
(86) PCT No.: PCT/EP01/08366

§ 371 (c)(1),
(2), (4) Date: Jan. 20, 2003

(87) PCT Pub. No.: WO02/08031

PCT Pub. Date: Jan. 31, 2002

(65) Prior Publication Data

US 2004/0091305 A1 May 13, 2004

(30) Foreign Application Priority Data

Jul. 21, 2000 (DE) ......................................... 100 35 476

(51) Int. Cl.⁷ ................................................ B06S 1/24
(52) U.S. Cl. .................... 403/24; 15/250.31; 296/96.17
(58) Field of Search .......................... 403/24; 15/250.31, 15/250.3, 192; 296/96.17, 96.15

(56) References Cited

U.S. PATENT DOCUMENTS 6,536,070 B1 * 3/2003 Fischer et al. ........... 15/250.31
2004/0021335 A1 * 2/2004 Schmid et al. ........... 296/96.15

FOREIGN PATENT DOCUMENTS

| DE | 198 09 630 | 9/1999 |
|---|---|---|
| DE | 198 33 404 | 1/2000 |
| FR | 2 770 880 | 5/1999 |

* cited by examiner

Primary Examiner—John R. Cottingham
(74) Attorney, Agent, or Firm—Young & Basile, P.C.

(57) ABSTRACT

A wiper arrangement for the windscreen of a motor vehicle includes a screwless securing device which enables the arrangement to be attached to a vehicle. The securing device includes at least three securing members arranged at a distance from each other, whereby two members are situated on a connecting line. The third securing member is arranged at a distance from the connecting line. The securing device also includes receiving devices with which the securing members can engage. The securing direction of at least one securing member and the corresponding receiving device is orientated in a substantially parallel position to the transversal extension of the windscreen in order to receive moments occurring while the wiper arrangement is in operation in an optimum manner.

14 Claims, 3 Drawing Sheets

WIPER ARRANGEMENT FOR THE WINDSCREEN OF A MOTOR VEHICLE

BACKGROUND

The present invention relates to a wiper arrangement for the windshield of a motor vehicle having a screwless securing device which has at least three securing members spaced apart from each other, two of which lie along one connecting line and the third is at a distance from the connecting line, and which comprises corresponding receiving devices which the securing members can engage.

A wiper arrangement of this kind is known from DE 198 33 404 A1. The windshield wiper arrangement disclosed in this product comprises a tubular supporting structure on which a total of three securing members configured as cylindrical mounting pins are provided. These securing members are thus provided on the wiper side. They are inserted axially into receiving holes which are located in special holders which are fixed to the vehicle body, that is to say, furnished on the vehicle side. In order to decouple the oscillations of the wiper arrangement from the vehicle body, the receiving holes on the vehicle side are provided with rubber grommets, which are set into suitable openings in the holders. Mounting pins, receiving holes and rubber grommets together form the securing device for the windshield wiper arrangement.

This wiper arrangement allows extremely simple and easy assembly of the wiper arrangement to the vehicle. However, it has been shown that under specific circumstances, for example when the blades of the wiper arrangement are blocked by snow, or blade movement is encumbered, the wiper arrangement become loose with respect to the vehicle.

The object of the present invention is, therefore, to prepare a wiper for which secure retention of the wiper arrangement with respect to the vehicle is ensured under all operating conditions.

SUMMARY

This object is achieved in the case of a wiper arrangement by having the securing device of at least one securing member and of the corresponding receiving device oriented essentially parallel to the transverse extension of the windshield.

In the present instance, the term "transverse extension of the windshield" is understood to mean a direction which runs from one side of a windshield to the other, from left to right or right to left, respectively, when viewed in the direction of the vehicle. In the case of the known wiper arrangement, two of the three mounting pins are oriented parallel to the transverse extension of the windshield, whereas one mounting pin is oriented perpendicular to the plane of the windshield. As part of the invention, it was recognized that the moments occurring with a windshield wiper blocked by snow, for example, or hampered in its movement, cannot be adequately absorbed by mounting pins oriented in this way. In conjunction with the cyclic loading from the wiper blades, and in the case of the known wiper arrangement with the frequency of the windshield wiper motion, the result can be the wiper arrangement "shaking loose" from the vehicle. The measure proposed under the invention is surprisingly simple and effective; as part of the invention it was recognized that this "shaking loose" is absent if the installation direction of at least one securing member is aligned essentially parallel to the transverse extension of the windshield.

As the result of this extremely simple step in accordance with the invention, a wiper arrangement is created which can be installed without screws by plugging it in and which remains securely anchored during operation.

It is particularly preferred if the installation direction of at least one securing member and the corresponding receiving device differs from the installation direction of at least one other securing member and the corresponding receiving device. With a wiper arrangement of this kind, the resulting forces and moments are absorbed especially well and positively.

Alternatively, or in combination with the installation direction described above aligned essentially parallel to the windshield extension, a wiper arrangement of this type can also be configured such that the installation directions of all the securing members and the corresponding receiving devices differ from each other. In the case of a wiper arrangement of this type, the installation direction of one securing member and the corresponding receiving device does not absolutely have to be aligned essentially parallel to the transverse extension of the windshield. In this instance, it is important that the installation direction differ whereby, in particular, the moments occurring during operation, which mostly act around different axes, can be positively absorbed. A wiper arrangement of this type remains securely anchored during operation.

The further development is particularly preferred in which the securing devices basically form a Cartesian system, meaning, for example, that the securing device of a first securing member and the corresponding receiving device are oriented essentially parallel to the transverse extension of the windshield, the securing device of a second securing member and the corresponding receiving device are oriented essentially parallel to the transverse extension of the windshield and the securing device of a third securing member and the corresponding receiving device are oriented essentially perpendicular to the plane of the windshield. A wiper arrangement of this kind has considerable advantages during assembly since the securing devices are easily identifiable to the installer for manual assembly and to the robot for automated assembly.

In a further development, an interesting variation is provided in which the installation directions of at least two securing members and the corresponding receiving devices are aligned essentially parallel to each and in opposite directions. If the installation direction of the third securing member and the corresponding receiving device is perpendicular to the installation directions mentioned, a wiper arrangement of this type can be installed by a rotational motion about the axis of the third securing member and the corresponding receiving device.

The invention also relates to a wiper arrangement of the type described above in which the installation directions of all the securing members and the corresponding receiving devices are basically parallel to each other. Surprisingly, even in the case of a wiper arrangement of this type, the wiper arrangement is largely secured against "shaking loose" with respect to the vehicle. The reason most probably lies in the fact that adequate spatial movement of the wiper arrangement is needed for an arrangement of this type to "shake loose", which clearly occurs less frequently in practice.

A wiper arrangement with essentially parallel installation directions is particularly simple to install if the installation direction is oriented essentially perpendicular to the windshield plane.

BRIEF DESCRIPTION OF THE DRAWING

In the following aspects of the invention are explained in detail with reference to the appended drawing. In the drawing.

DETAILED DESCRIPTION

Figure 1:
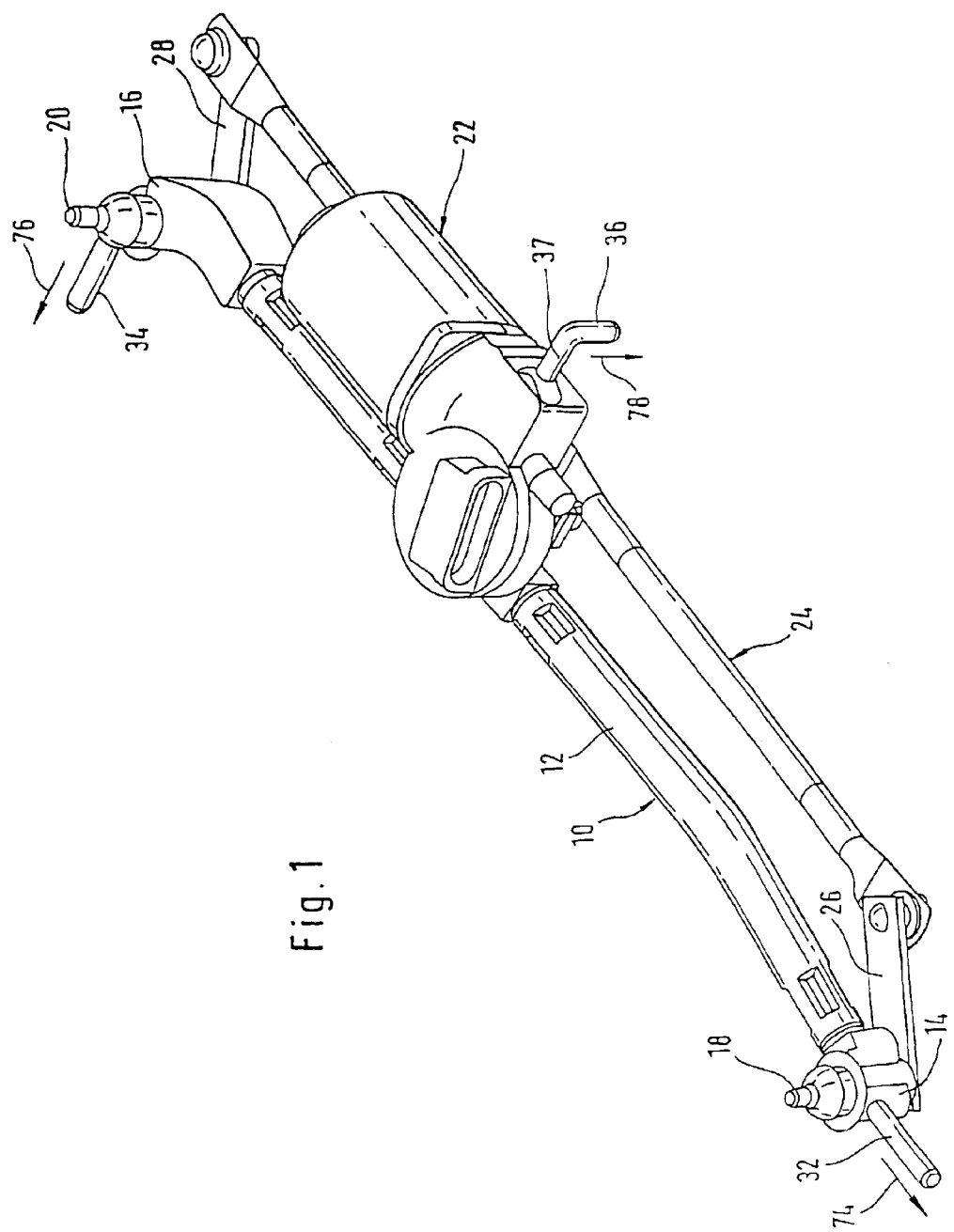
FIG. 1 shows a perspective representation of a windshield wiper arrangement with securing members of a securing device.

A wiper arrangement for a motor vehicle in FIG. 1 has the overall reference numeral 10. It comprises a tubular supporting structure 12, which supports a bearing housing 14 or 16 at both ends. A wiper shaft 18 or 20 to receive a windshield wiper arm is axially secured in each bearing housing 14 or 16 and carried for rotation.

A drive unit 22, which operates on a connecting linkage 24, sits approximately on the center section of the supporting structure. One end of the linkage 24 is connected in an articulated manner to a crank 26, which in turn is rigidly coupled to the wiper shaft 18. The other end of the connecting linkage 24 is connected in an articulated manner to a crank 28, which is rigidly coupled to the other wiper shaft 20.

The windshield wiper arrangement 10 can be attached by means of a screwless plug-in connection below a windshield 30 (see FIGS. 2 and 3) of a vehicle body. For this purpose, each bearing housing 14, 16 carries a cylindrical mounting pin 32, 34. The left mounting pin 32 in FIG. 1 extends at a right angle to the wiper shaft 18 from the bearing housing 14, specifically in a direction roughly parallel to the longitudinal extension of the supporting structure 12. The right mounting pin 34 in FIG. 1 extends at a right angle to the wiper shaft 20 from the bearing housing 16 in a direction perpendicular to the alignment of the mounting pin 32. A further mounting pin has the reference numeral 36 and is rigidly attached to a spacing piece 37 on the side of the drive device 22 away from the supporting structure 12.

All three mounting pins 32, 34 and 36 therefore lie perpendicular to one another in the sense of a Cartesian system. Together, the mounting pins 32, 34 and 36 lie at the angles of a triangle and form a stable support base.

Figure 2:
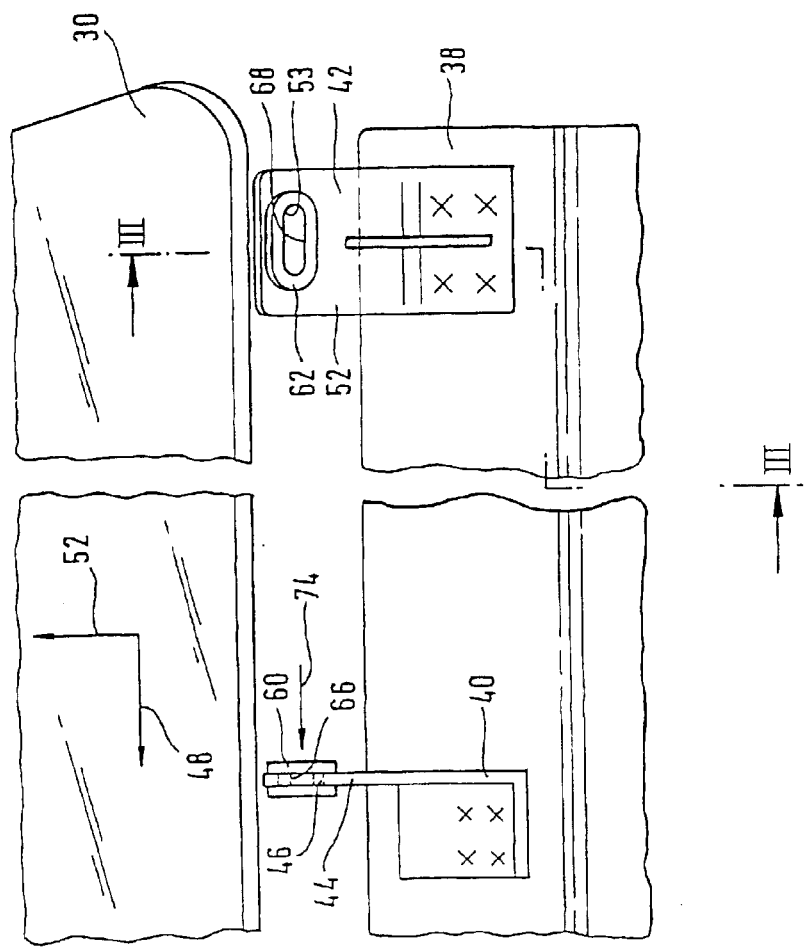
FIG. 2 shows receiving devices for the securing device for the wiper arrangement in FIG. 1.

As can be seen from FIG. 2, two holders 40 and 42 are spot welded to a structural metal panel 38 of the vehicle. The left holder 40 in FIG. 2 comprises an attaching section 44 lying essentially perpendicular to the structural panel 38, with a circular hole 46 in the section 44. The plane of the attaching section 44 is therefore perpendicular to the plane of the windshield 30, and the normal of the attaching section 44 extends parallel to the transverse extension 48 of the windshield 30.

The right holder 42 in FIG. 2 similarly comprises an attaching section 50 which is likewise located perpendicular to the plane of the windshield 30, but the normal of the section 50 is aligned parallel to the longitudinal extension 52 of the windshield 30. The transverse extension 48 of the windshield 30, when viewed in the direction of the vehicle, thus extends from one side of the vehicle to the other, whereas the longitudinal extension 52 of the windshield 30, when viewed in the direction of the vehicle, runs from front to rear. There is an elongated hole 53 in the attaching section 50 which runs parallel to the transverse extension 48 of the windshield 30.

An additional holder 54 is furnished on the structural metal panel 38 of the vehicle which is similarly spot welded to the structural metal panel 38. The holder 54 is trapezoidal in cross section with an attaching section 56 parallel to the structural metal panel 38. There is a hole 58 in the attaching section 56. Overall, the attaching section 56 is approximately parallel to the plane of the windshield 30. Corresponding rubber grommets 60, 62 and 64, in which there are in turn receiving openings 66, 68 and 70, are inserted into hole 46 in the attaching section 44 of holder 40, into hole 53 of holder 42 and into hole 58 in the attaching section 56 of attachment 54. The diameter of the receiving opening 66, 68 and 70 (receiving opening 68 is also configured as an elongated hole to compensate for tolerances) is dimensioned such that the mounting pins 32, 34 and 36 are all located as a press fit in the receiving openings 66, 68 and 70.

The mounting pins 32, 34 and 36, the rubber grommets 60, 62 and 64 with the receiving openings 66, 68 and 70 together form a securing device 72 to attach the windshield wiper arrangement 10 to the vehicle (no reference numeral). Assembly proceeds as follows:

First, mounting pin 32 is introduced into the receiving opening 66 in the rubber grommet 60 in the installation direction indicated by the arrow 74. As soon as the mounting pin 32 is fully inserted into the receiving opening 66 up to the stop, mounting pin 34 can be introduced by a swiveling motion of the windshield wiper arrangement 10 into the receiving opening 68 in the rubber grommet 62 in the installation direction indicated by the arrow 76. The axis of rotation for the swiveling motion lies in the area of rubber grommet 60. Finally, by a tilting motion of the windshield wiper arrangement 10, mounting pin 36 is inserted into the receiving opening 70 in rubber grommet 64 in the installation direction indicated by the arrow 78. The tilting motion is performed about an axis which passes approximately through rubber grommets 60 or 62.

In this way, simple, screwless assembly of the windshield wiper arrangement to the vehicle is ensured. All the moments which can occur during operation of the windshield wiper arrangement 10 are safely absorbed through the Cartesian arrangement of the installation directions 74, 76, and 78.

Several aspects for possible orientations of the installation directions are shown in FIGS. 4–11. The installation direction in each case is indicated by an arrow, a circle corresponds to an installation direction perpendicular to the plane of the page. In addition, the sequence during assembly is given for each securing point by a number.

Figure 3:
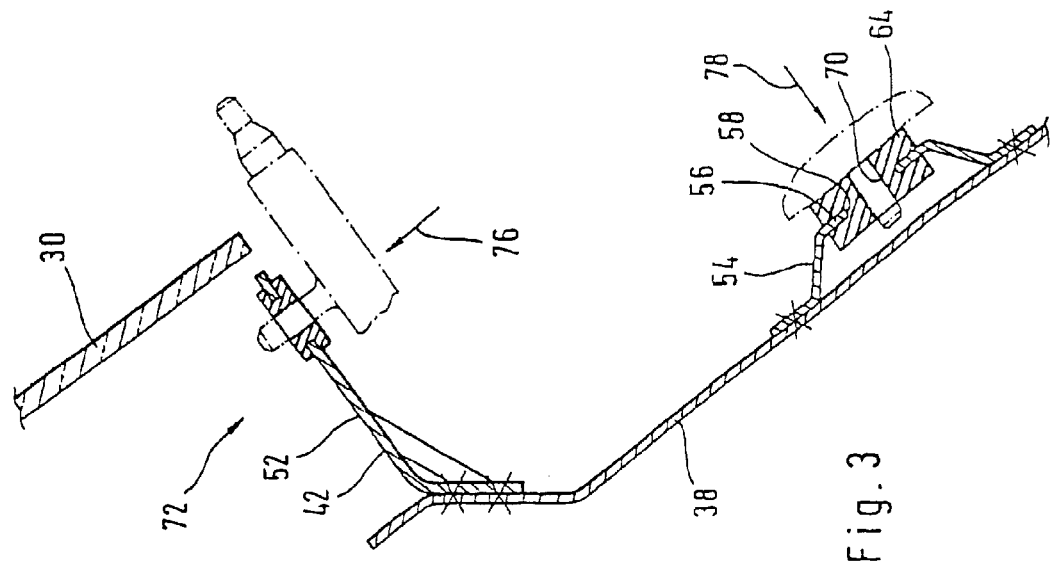
FIG. 3 shows a section along the line III—III in FIG. 2.
Figure 4:
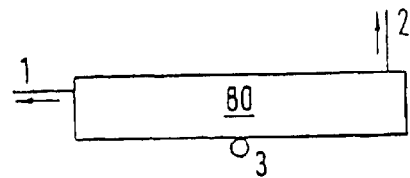
FIG. 4 shows a schematic representation of the installation directions of the wiper arrangement from FIGS. 1–3.
Figure 5:
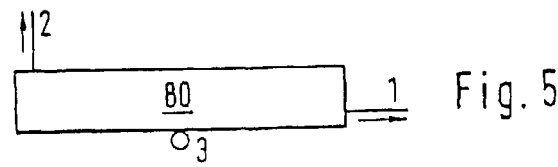
FIG. 5 shows a representation similar to FIG. 4 of a second aspect for orienting the installation directions.
Figure 6:
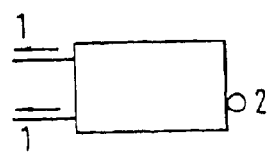
FIG. 6 shows a representation similar to FIG. 4 of a third aspect for orienting the installation directions.
Figure 7:
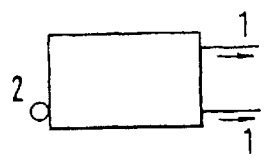
FIG. 7 shows a representation similar to FIG. 4 of a fourth aspect for orienting the installation directions.
Figure 8:
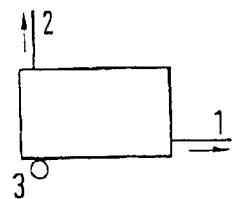
FIG. 8 shows a representation similar to FIG. 4 of a fifth aspect for orienting the installation directions.
Figure 9:
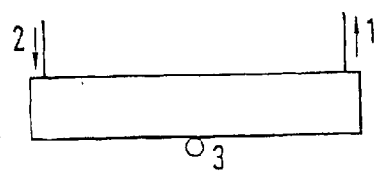
FIG. 9 shows a representation similar to FIG. 4 of a sixth aspect for orienting the installation directions.
Figure 10:
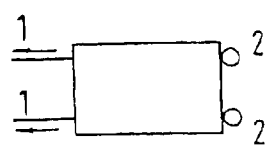
FIG. 10 shows a representation similar to FIG. 4 of a seventh aspect for orienting the installation directions.
Figure 11:
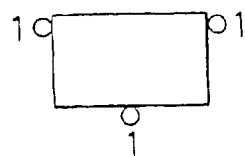
FIG. 11 shows a representation similar to FIG. 4 of an eighth aspect for orienting the installation directions.

The arrangement shown in FIG. 4 (supporting structure, drive device, etc. are not shown in detail; the unit which they constitute has the overall reference numeral 80) corresponds to the aspect shown in FIGS. 1–3. The unit shown in FIG. 5 is assembled similarly to the windshield wiper arrangement shown in FIGS. 1–4, and it is particularly suitable for use in vehicles with right-hand drive.

The windshield wiper systems 10 shown in FIGS. 6–8 and 10 and 11 are particularly compact and are thus particularly well suited for use in rear window wipers. In the case of the windshield wiper system 10 shown in FIG. 9, installation is carried out by means of a swiveling motion around the axis of mounting pin 36.

What is claimed is:

1. In a motor vehicle having a centerline extending from a front end to a rear end and a windshield extending transversely with respect to the centerline of the motor vehicle, the improvement of a wiper arrangement for the windshield of the motor vehicle having a securing device which has at least three securing members spaced apart from each other, two of which lie on one connecting line and the third is at a distance from the connecting line, and which comprises corresponding receiving devices which the securing members can engage without screws, the installation direction of at least one securing member oriented essentially parallel to the transverse extension of the windshield.

2. The wiper arrangement from claim 1, wherein the installation direction of at least one securing member and the corresponding receiving device differs from the installation direction of at least one other securing member and the corresponding receiving device.

3. A wiper arrangement for a windshield of a vehicle having a securing device which has at least three securing members spaced apart from each other, two of which lie on one connecting line and the third is at a distance from the connecting line, and corresponding receiving devices which the securing members can engage without screws, wherein the installation directions of all the securing members and the corresponding receiving devices differ from each other.

4. The wiper arrangement from claim 3, wherein the installation direction of a first securing member and the corresponding receiving device is orientable essentially parallel to transverse extension of the windshield to be wiped, the installation direction of a second securing member and the corresponding receiving device is orientable essentially parallel to the longitudinal extension of the windshield to be wiped, and the installation direction of a third securing member and the corresponding receiving device is orientable essentially perpendicular to the plane of the windshield to be wiped.

5. The wiper arrangement from claim 3, wherein the installation directions of at least two of the securing members and the corresponding receiving devices are oriented essentially parallel and in opposite directions to each other.

6. In a motor vehicle having a centerline extending from a front end to a rear end and a windshield extending transversely with respect to the centerline of the motor vehicle, the improvement of a wiper arrangement for the windshield of the motor vehicle having a securing device which has at least three securing members spaced apart from each other, two of which lie on a connecting line and the third at a distance from the connecting line, and corresponding receiving devices which the securing members can engage without screws, characterized in that the installation directions of all the securing members and the corresponding receiving devices are essentially parallel to each other.

7. The wiper arrangement from claim 6, wherein the installation direction is essentially parallel to the plane of the windshield.

8. In a motor vehicle having a centerline extending from a front end to a rear end and a windshield extending transversely with respect to the centerline of the vehicle, the improvement of a wiper arrangement for the windshield of the motor vehicle comprising:

a securing device having at least three securing members spaced apart from each other, two securing members lying on one connecting line and another securing member located at a distance from the connecting line; and corresponding receiving devices operably engagable with the securing members without screws, the installation direction of at least one securing member oriented essentially parallel to a transverse direction running from one vertically extending side to another vertically extending side of the windshield to be wiped.

9. The wiper arrangement of claim 8, wherein the installation direction of at least one securing member and the corresponding receiving device differs from the installation direction of at least one other securing member and the corresponding receiving device.

10. In a motor vehicle having a centerline extending from a front end to a rear end and a windshield extending transversely with respect to the centerline of the motor vehicle, the improvement of a wiper arrangement for the windshield of the vehicle comprising:

a securing device having at least three securing members spaced apart from each other, two securing devices lying on one connecting line and another securing device located at a distance from the connecting line; and corresponding receiving devices operably engagable with the securing members without screws, wherein the installation directions of all the securing members and the corresponding receiving devices differ from each other.

11. The wiper arrangement of claim 10, wherein the installation direction of a first securing member and the corresponding receiving device extends essentially parallel to a transverse direction from one vertically extending side to another vertically extending side of the windshield to be wiped, the installation direction of a second securing member and the corresponding receiving device extends essentially parallel to the longitudinal direction from one horizontally extending side to another horizontally extending side of the windshield to be wiped, and the installation direction of a third securing member and the corresponding receiving device extends essentially perpendicular to the plane of the windshield to be wiped.

12. The wiper arrangement of claim 10, wherein the installation directions of at least two of the securing members and the corresponding receiving devices extend essentially parallel and in opposite directions to each other.

13. In a motor vehicle having a centerline extending from a front end to a rear end and a windshield extending transversely with respect to the centerline of the motor vehicle, the improvement of a wiper arrangement for the windshield of the motor vehicle comprising:

a secured device having at least three securing members spaced apart from each other, two securing members lying on a connecting line and another securing member located at a distance from the connecting line; and corresponding receiving devices operably engageable with the securing members without screws, such that the installation directions of all the securing members and the corresponding receiving devices are essentially parallel to each other.

14. The wiper arrangement of claim 13, wherein the installation direction extends essentially parallel to the plane of the windshield to be wiped.

* * * * *